US007707352B2

(12) United States Patent  
Bolanowski et al.

(10) Patent No.: US 7,707,352 B2
(45) Date of Patent: Apr. 27, 2010

(54) METHOD FOR MANAGING STORAGE AREA IN A PORTABLE RADIO COMMUNICATION EQUIPMENT

(75) Inventors: Wladyslaw Bolanowski, Bara (SE); Peter Egelberg, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 440 days.

(21) Appl. No.: 11/573,153

(22) PCT Filed: Aug. 5, 2005

(86) PCT No.: PCT/EP2005/008540

§ 371 (c)(1),
(2), (4) Date: Jul. 24, 2007

(87) PCT Pub. No.: WO2006/013113

PCT Pub. Date: Feb. 9, 2006

(65) Prior Publication Data

US 2007/0283080 A1 Dec. 6, 2007

(30) Foreign Application Priority Data

Aug. 5, 2004 (EP) .................................. 04018594

(51) Int. Cl.
*G06F 12/00* (2006.01)
(52) U.S. Cl. ....................................................... 711/103
(58) Field of Classification Search ........................ None
See application file for complete search history.

(56) References Cited

U.S. PATENT DOCUMENTS

2003/0023964 A1   1/2003   Rajaram et al.
2005/0177696 A1*  8/2005   Smith et al. ................. 711/170

FOREIGN PATENT DOCUMENTS

EP    1 164 476 A2    12/2001
GB    2271202         4/1994

OTHER PUBLICATIONS

International Search Report for corresponding Application No. PCT/EP2005/008450 mailed Mar. 21, 2006.
"Inside Macintosh Memory Chapter I"; 1992; Addison-Wesley Publishing Company; XP002282492.

* cited by examiner

*Primary Examiner*—Hiep T Nguyen
(74) *Attorney, Agent, or Firm*—Renner, Otto, Boisselle & Sklar, LLP

(57) ABSTRACT

The present invention relates to a method for managing storage area in a flash memory of a portable radio communication equipment, whereby the flash memory comprises a raw storage section for storing software code and a file system storage section for storing file information, comprising the steps of receiving size information about the size of additional software code or information to be stored in the raw storage section, and allocating free space from the file system storage section to store the additional software code. The present invention further relates to a computer program product and a portable radio communication equipment for performing the method.

8 Claims, 4 Drawing Sheets

METHOD FOR MANAGING STORAGE AREA IN A PORTABLE RADIO COMMUNICATION EQUIPMENT

TECHNICAL FIELD OF THE INVENTION

The present invention relates to a method for managing storage area in a flash memory of a portable radio communication equipment. The present invention further relates to a computer program product directly loadable into the internal memory of a portable radio communication equipment for performing the managing method as well as to a portable radio communication equipment comprising means for performing the managing method.

DESCRIPTION OF RELATED ART

Currently, in portable radio communication equipments, such as mobile telephones, communicators, and so forth, for the communication in wireless communication systems, such as GSM, UMTS or any other available or future system, one concern is the size of the executable software code stored in the portable radio communication equipment. The functionalities and applications provided by a portable radio communication equipment in these times are increasing rapidly so that the size of the executable software code to be stored within the equipment becomes larger and larger. Usually, the software code is stored in a flash memory provided in the portable radio communication equipment. These flash memories are available in discrete, predefined sizes like 16 MB, 32 MB, 64 MB and so forth. Thus, the storage of the software code in the flash memory provides a considerable contribution to the production cost of a portable radio communication equipment. If the executable software code size becomes too large and the next size of a flash memory is necessary, this means a considerable additional cost for the portable radio communication equipment.

In current portable radio communication equipments, the flash memory comprises two sections, namely a raw storage section for storing software code and a file system storage section for storing file information. The raw storage section which stores the executable software code might additionally be used for the storage of data for special purposes. Hereby, the raw mode of a reportable radio communication equipment is the mode in which the operating system, the software platform and the software applications have not yet been started and the initial execution is based on some initialisation software code initialising the operation of the portable radio communication equipment. Hereby, the raw storage section comprises the initial executable software code as well as the normal executable software code necessary for the operation of the portable radio communication equipment as well as all further necessary software applications. Generally, the executable software code stored in the raw storage section is also called software image, which means the executable, binary instance of the software code.

The above mentioned strict separation of the flash memory into two sections allocating some physical flash space for the software code and the file information is not sufficiently flexible. Due to maintenance and evolution of the software code and the software applications, it would be necessary to reserve some additional unused space in the raw storage sections for the further expansion of the software code. Also, in case that updates of the software code or information about such updates are received, for example, by means of a wireless technology such as FOTA (firmware upgrading over the air), additional unused raw storage space is necessary in order to store the downloaded software delta, i.e. the difference between the two software versions, for upgrading the old software into a newer software version. In both cases, the reserved but unused raw storage space cannot be used for the file system but only for the additional software code or the received FOTA package comprising information about a software update, thus limiting the maximum file system space.

SUMMARY

The object of the present invention is therefore to provide a method for managing storage area in a flash memory of a portable radio communication equipment which enables a more flexible allocation of the flash storage space to the raw storage section and the file system storage section.

The above object is achieved by a method for managing storage area in a flash memory of a portable radio communication equipment according to claim 1, whereby the flash memory comprises a raw storage section for storing software code and a file system storage section for storing file information, comprising the steps of receiving size information about the size of additional software code or information to be stored in the raw storage section, and allocating free space from the file system storage section to store the additional software code or information.

The additional software code to be stored in the raw storage section can for example be expansion or upgrade software code expanding or upgrading, respectively, the software already stored in the raw storage section. The additional information to be stored in the raw storage section is for example upgrade or expansion information containing information about upgrades or expansions of the software code stored in the raw storage section, e.g. for example a FOTA package or any other additional software code necessary for the future operation of software code or information stored in the raw storage section.

The present invention enables the initial separation of a flash memory into a raw storage section and a file system storage section so that only the space necessary for storing executable software code as well as eventual additional special data is provided for the raw storage section and the remaining space of the flash memory can be allocated to the file system storage section. In case that more space is needed in the raw storage section either continuously or temporarily, this additional space is flexibly allocated from the file system storage section to the raw storage section so that additional software code or information can be continuously or temporarily stored.

The present invention therefore enables a simple but flexible allocation of storage area in a flash memory of a portable radio communication equipment.

Advantageously, the allocating step comprises the step of checking if the file system storage section has sufficient free space corresponding to the size of the additional software code or information. Hereby, in case that the file system storage section does not have sufficient free space, the user is advantageously given the opportunity to remove files from the file system storage section. Further, in said checking step it is advantageously determined if the file system storage section has sufficient continuous free space corresponding to the size of the additional software code or information. Hereby, in case it is determined that the file system storage section has sufficient free space but not sufficient continuous free space, a continuous area having the size of the additional software code or information is advantageously created.

Further advantageously, the file system storage section comprises an additional software code indicator for temporarily indicating if free space from the file system storage section is allocated to additional software code or information.

Further advantageously, in case that the free space from the file system storage section allocated to the additional software code or information is not necessary for the storage of the additional software code or information anymore, it is allocated back to the file system storage section.

The present invention further relates to a computer program product directly loadable into the internal memory of a portable radio communication equipment, comprising software code portions for performing the steps of the method for managing storage area according to the present invention.

Further, the present invention relates to a portable radio communication equipment for communication in a radio communication system, comprising means for performing the steps of the method for managing storage area according to the present invention.

It is to be noted that the term portable radio communication equipment includes all equipment such as mobile telephones, pagers, communicators, i.e. electronic organisers, smart phones and the like which are portable by the user and which are able to communicate in a wireless communication system, such as GSM, UMTS or any other present or future communication system of short, middle and long range.

Further, the term comprising/comprises when used in the specification is taken to specify the presence of the stated features, introduced steps or components but does not preclude the presence or addition of one or more other features, introduced steps, components or groups thereof.

BRIEF DESCRIPTION OF THE DRAWINGS

The present invention will be explained in more detail on the basis of preferred embodiments thereof in relation to the enclosed drawings, in which.

DETAILED DESCRIPTION OF EMBODIMENT

Figure 1:
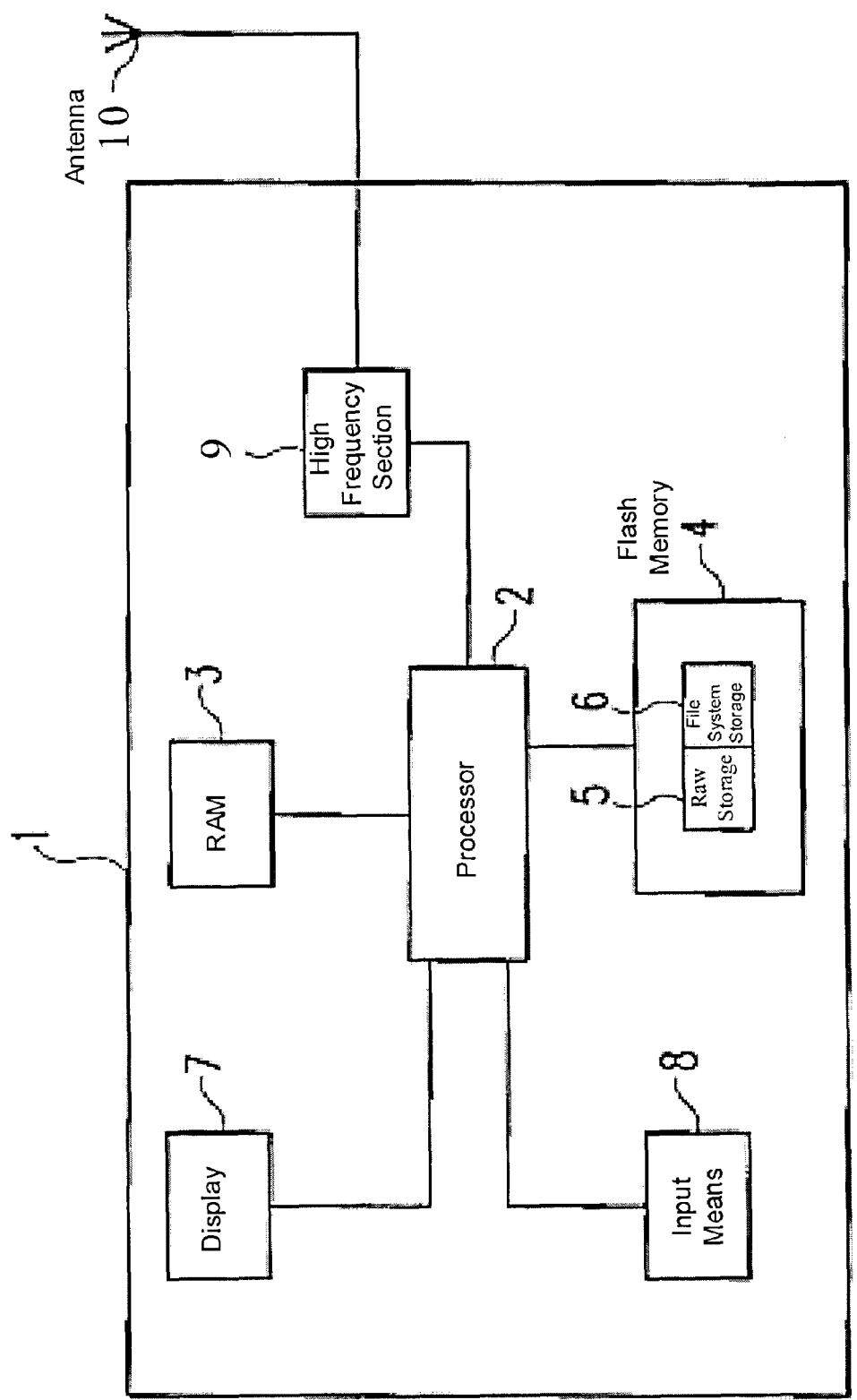
FIG. 1 shows a schematic block diagram of a portable radio communication equipment according to the present invention.

FIG. 1 shows a schematic block diagram of a portable radio communication equipment 1 according to the present invention. The portable radio communication equipment 1 is adapted to communicate with a base station or other portable radio communication equipments in a wireless communication system, e.g., the GSM, UMTS or any other suitable present or future system and comprises the necessary elements, such as a high frequency section 9 and an antenna 10 as shown in FIG. 1. By means of the antenna 10 and high frequency section 9 connected with the antenna, the portable radio communication equipment 1 is able to transmit and receive signals in a wireless communication system under the control of a processor 2. The processor 2 is for example a base-band processor and can be implemented in any known or future technology, such as a combination of hardware and software depending on the required application area of the portable radio communication equipment 1.

The processor 2 is connected to and/or comprises a RAM (random access memory) 3 and a flash memory 4. The flash memory 4 comprises a raw storage section 5 for storing executable software code and a file system storage section 6 for storing file information. The raw storage section is usually a ROM section and could additionally comprise additional space for storing special data, e.g. additional information about update software or the like.

The portable radio communication equipment 1 further comprises all necessary elements and features for a normal operation such a display 7, input means 8, as for example a keyboard, jog dial or the like, and so forth.

The raw storage section 5 of the flash memory 4 initially comprises executable software code and optionally additional area for special data storage but no reserve or unused space for storing additional software code or information. The remaining part of the flash memory is allocated to the file system storage section for storing file information. According to the present invention, if an expansion of the raw storage section 5 is needed, for example, for storing additional software code or additional information, which is, for example, a software extension, a software upgrade, information about such upgrades or the like, free space from the file system storage section 6 is flexibly allocated to the raw storage section 5. Hereby, a check is made if the required amount of storage space is available in the file system storage section. If not, the user is instructed to remove some files in order to match the space requirement. If the required space amount is available, the space is allocated to the raw storage section. Hereby, the needed flash space that has to be re-allocated from the file system storage section 6 to the raw storage section 5 is specified. Then a start address for a raw data storage that has to be allocated is specified. Afterwards, all used physical blocks in the file system storage section 6 that are in the region that has to be allocated are determined. All these blocks are physically re-allocated into an area in the file system region that will remain to be in the file system. The logical block table in the file system is updated with new physical block numbers for blocks that have been reallocated. Then the logical blocks for this new raw storage area are removed from the file system list. When the newly created raw storage area is no longer needed, as for example is a software update has been successfully made, this storage area can be allocated back to the file system.

Figure 2A:
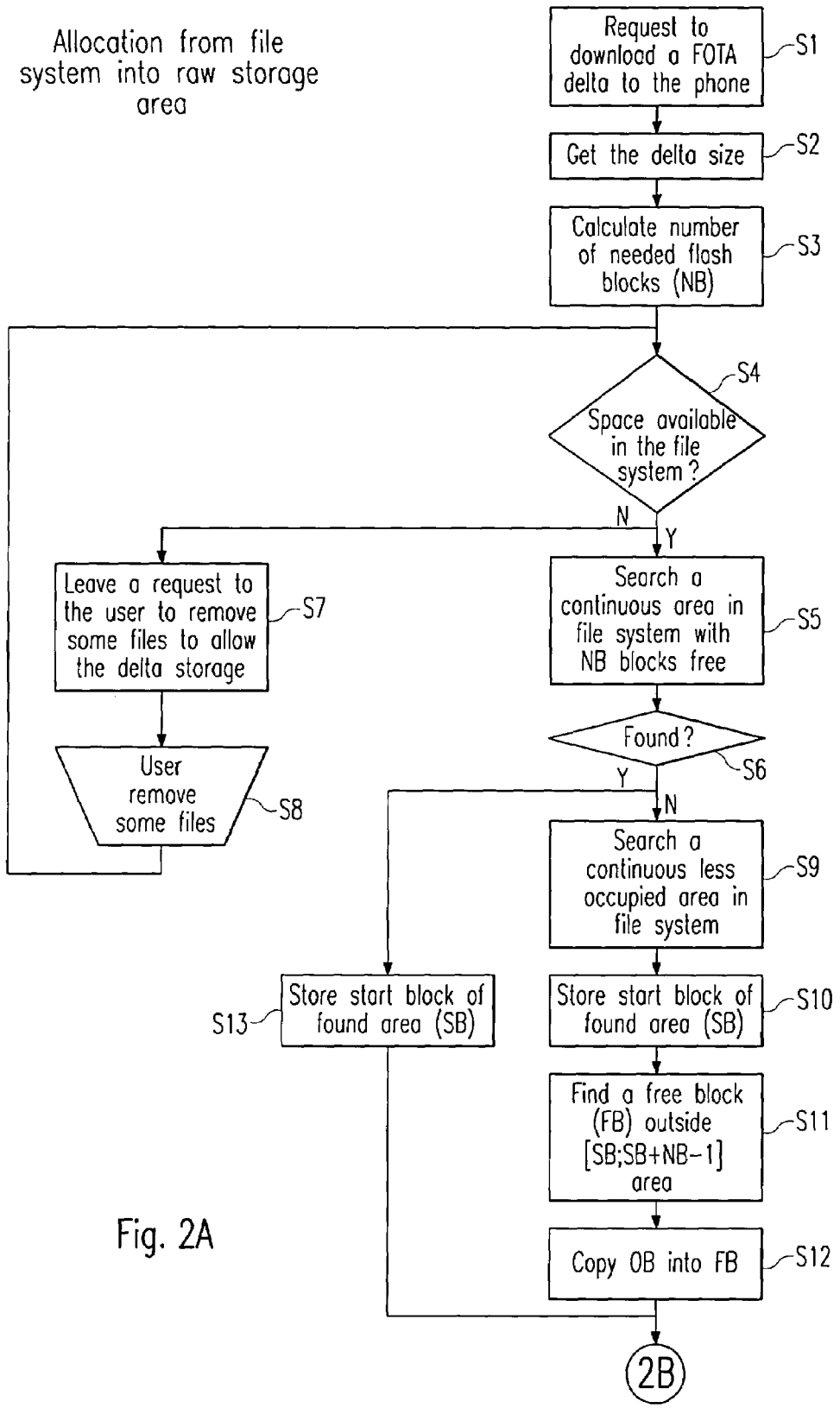
FIGS. 2A and 2B show a flow chart explaining the flexible allocation of storage space from the file system storage section to the raw storage section.
Figure 2B:
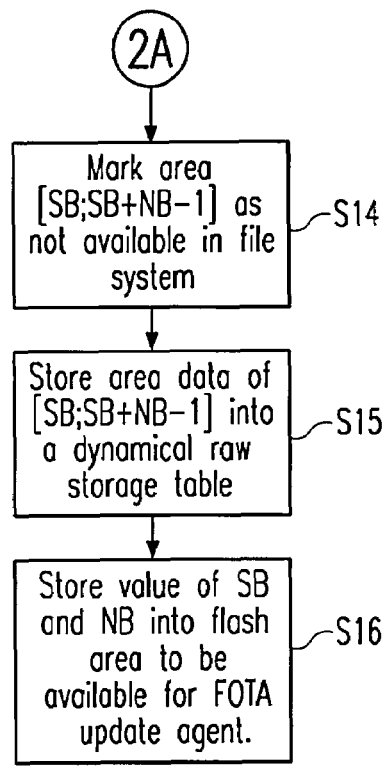

In FIGS. 2A and 2B, the flexible allocation of free space from the file system storage 6 to the raw storage section 5 is explained in detail in relation to a FOTA (Firmwave upgrading over the air), i.e. a FOTA package or FOTA delta comprising information about a software upgrade which is received via the wireless communication system.

As shown in the flow chart of FIG. 2A and the first step S1, a request to download a FOTA delta to the portable equipment is received. A FOTA delta is information about the difference between two software code versions which is received via the wireless communication system. A request can for example be generated by the user of the portable equipment 1 or can be generated by the network. The downloading of a FOTA delta from a network server is supported by a FOTA component in the portable equipment. This component is executed usually in the normal portable equipment mode within the application domain. Usually, the FOTA delta is stored in a flash segment that is accessible from a FOTA update agent, which is a component to be executed in the raw mode of the portable equipment operation. It uses the FOTA delta as an input to compute the new version of the software code and to reflash the portable equipment with this new software version.

After the step S1, the download client, i.e. the portable equipment 1 gets the delta size information from the server from where the delta is being distributed in a second step S2. Hereafter, the number NB of needed flash blocks is calculated in a third step S3. Usually, the delta size is expressed in numbers of flash blocks, whereby the flash block size depends on the flash memory characteristics and is typically 64 or 128 KB or the like.

In the next step S4, it is checked if sufficient space is available in the file system storage section 6. Specifically, it is checked if there are NB blocks free in the file system storage section 6. If the check was successful, a continuous area in the file system storage section 6 with NB blocks free is searched in the next step S5.

If in step S4, it is found that it is not sufficient space available in the file system storage section 6, a request is issued to the user of the portable equipment 1 to remove some files from the file system storage section in order to allow the delta storage in a step S7. If a user removes some files from the file storage section 6 in the next step S8, the procedure returns to step S4 and checks if there is sufficient space available in the file system storage section 6.

After the search of a continuous area of NB blocks in step S5, the next step S6 checks if such a continuous area with free space was found. If, yes, the start block SB of the found area comprising continuous NB free blocks is stored in step S13.

If a continuous area with NB blocks could not be found in step S6, a continuous less occupied area in the file system storage section 6 is searched in step S9. Hereby, a continuous area of NB physical blocks within the file system storage section 6 with the fewest number of occupied blocks is searched (cf. FIG. 4a explained further below).

If such an area of NB blocks with the lowest number of occupied blocks has been found in step S9, the start block SB of the found area is stored in the next step S10. Then, in a next step S11, for each occupied block OB in the area found in step S9, a free block FB outside the found area is searched (and found). In the following step S12, the occupied block OB is then copied into the found free block FB found in step S11. This includes both the content of the block OB and the logical block identification (cf. FIGS. 4b and 4c explained further below). The steps S11 and S12 are repeated for each occupied block OB in the area found in the step S9. This area found in step S9 can also be identified as [SB; SB+NB−1].

After the steps S11 and S12 have been performed for each occupied block OB in the area found in step S9, the procedure continues with the next step S14, which is shown in the next part of the flow chart shown in FIG. 2B. In step S14, the area [SB; SB+NB−1] either identified by step S13 or by the succession of steps S9 to S12 is marked as not available in the file system storage section 6, and the area data are stored into a dynamical raw storage table in the next step S15. Hereby, the dynamic raw storage area table contains the SB value and a list of logical and physical blocks that belong into this area.

In the next step S16 the value of SB and NB are stored into the flash area to be available for the FOTA update agent (cf. FIG. 4d explained further below).

Figure 3:
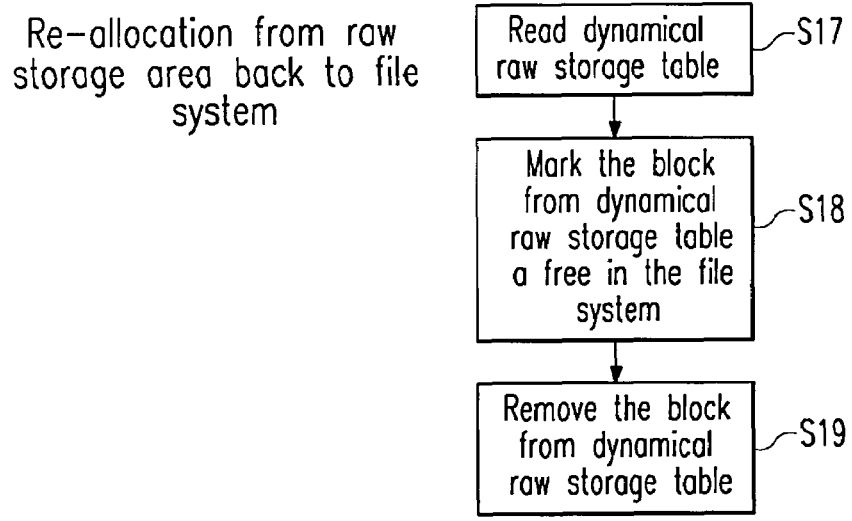
FIG. 3 shows a block diagram of the re-allocation of storage space from the raw storage section back to the file system storage section.

The extended space available for the raw storage section 5 is then used to update or extend the executable software code in the raw storage section 5. The flexible allocation of additional storage space to the raw storage section 5 as just explained can be temporary or continuous. If the space allocation is only temporary and the additional storage space is not necessary anymore after the software extension or update, the additional space or at least the part of the additional space which is not necessary anymore can be allocated back to the file system storage section 6. The corresponding procedure is shown in the flow chart of FIG. 3. Hereby, in the first step S17, the dynamical raw storage table of the raw storage section 5 is read and each block from the dynamical raw storage table is marked as free in the file system storage section 6 in a succeeding step S18. In a next step S19, the block is removed from the dynamical raw storage table so that the respective block is re-allocated to the file system storage section 6. The steps S17 to S19 are performed for every block stored in the dynamical raw storage table. The dynamical raw storage table indicates the blocks which were flexibly allocated from the file system storage section 6 to the raw storage section 5.

In FIGS. 4a, 4b, 4c, 4d and 4e, the flexible allocation of free space from the file system storage section 6 to the raw storage section 5 of the flash memory 4 is explained by way of an example. Hereby, the file system storage section 6 for example consists of 18 blocks, whereby 5 blocks are necessary for storing additional software code or information, for example, FOTA update software, in the raw storage section 5. Only as an example, the addresses of the 18 blocks of the file system storage section 6 are X+0 to X+17. It is to be noted that the second block at address X+1 comprises a FOTA indicator indicating if one or more of unused blocks from this file system storage section 6 are allocated temporarily or continuously to the raw storage section 5. In the initial state shown in FIG. 4a, the FOTA indicator is set to "0".

Figure 4:
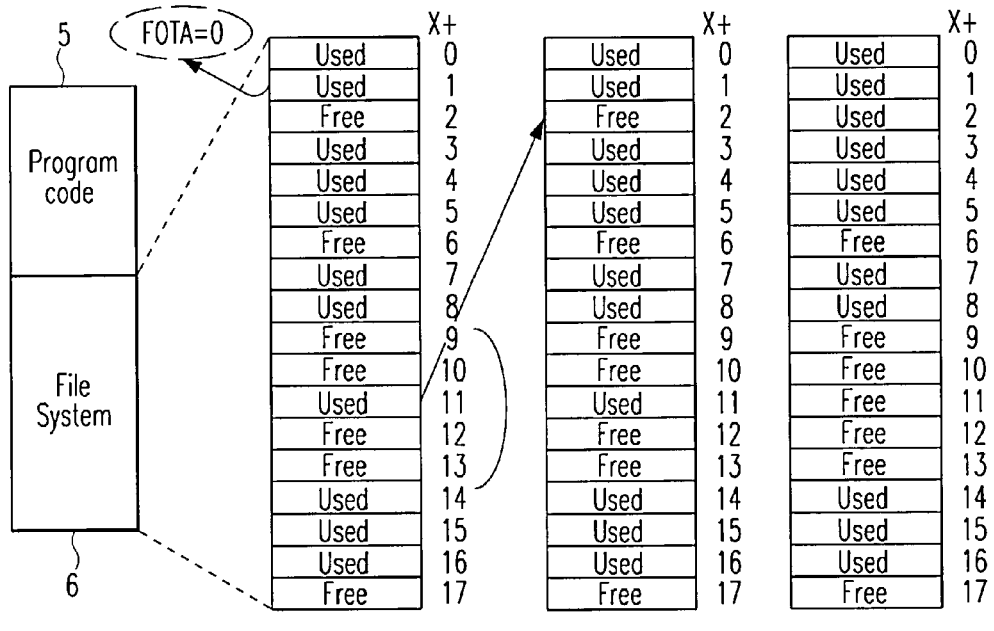
FIGS. 4a, 4b, 4c, 4d, 4e show an example of the flexible allocation of free storage space from the file system storage section to the raw storage section.
Figure 4:
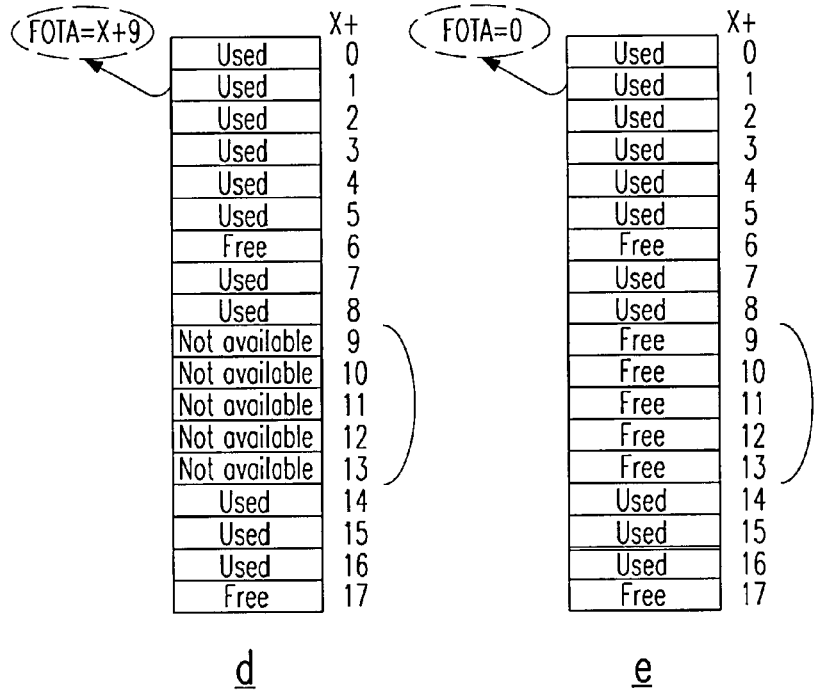

In the example shown in FIG. 4a, a request is received that 5 additional blocks are needed for the raw storage section 6. Then, the entire file system storage section 6 is searched if there is generally enough space available (cf. step S4 of FIG. 2a). If there is generally enough space available, then it is checked if a continuous area of 5 blocks is available (cf. step S5 in FIG. 2A). In the example shown in FIG. 4a, there are no 5 consecutive blocks unused in the file system storage section 6, so that the procedure searches for 5 consecutive blocks with the fewest used or occupied blocks. In the example shown in FIG. 4a, the blocks X+9 to X+13 comprise only a single used block X+11, so that X+9 is stored as the start block SB (cf. step S10 in FIG. 2A). As shown in FIG. 4B, block X+2 was identified as a free or unused block so that the content of block X+11 can be moved to block X+2, as shown in FIG. 4c. This corresponds to steps S11 and S12 in FIG. 2A. Now, blocks X+9 to X+13 are 5 consecutive unused blocks which are allocated to the raw storage section 5 by marking these blocks as "not available" for the file system storage section 6 and by making them available for storing executable software code. Hereby, the FOTA indicator in block X+1 is set to X+9, which is the physical address of the first block of the NB area allocated to the raw storage section 5.

After the FOTA updating is done, the blocks X+9 to X+13 are released again by setting the blocks back "free" as indicated in FIG. 4e in the file system storage section 6 and by setting the FOTA indicator to "0".

It is to be noted that the above-mentioned procedures and methods are performed under the control of the processor 2 using the flash memory 4 and eventually additionally RAM memory 3. The procedures can hereby be stored as software code in the flash memory 4 or any other suited memory or can consist of a combination of software and hardware elements. The present invention optimises the usage of the storage area in the flash memory 4 by avoiding a static and inflexible reservation of space for the raw storage section 5 and the file system storage section 6.

The invention claimed is:

1. Method for managing storage area in a flash memory of a portable radio communication equipment, whereby the flash memory comprises a raw storage section for storing software code and a file system storage section for storing file information, comprising the steps of receiving size information about the size of additional software code or information to be stored in the raw storage section, and allocating free space from the file system storage section to store the additional software code or information, the allocating step comprising the step of checking if the file system storage section has sufficient free space corresponding to the size of the additional software code or information, whereby free space from the file system storage section is only allocated to store the additional software code or information and the additional software code or information is only stored in said allocated space if said file storage section has sufficient free space, the allocating step further comprising determining, based on said received size information, a number of flash blocks required to store said additional software code or information, and searching, in said file system storage section, for a continuous storage area having a size equal to said determined number of flash blocks and including the lowest number of occupied blocks in said file system storage section.

2. Method for managing storage area according to claim 1, whereby in case that the file system storage section does not have sufficient free space, the user is given the opportunity to remove files from the file system storage section.

3. Method for managing storage area according to claim 1, whereby in said checking step it is determined if the file system storage section has sufficient continuous free space corresponding to the size of the additional software code or information.

4. Method for managing storage area according to claim 3, whereby in case it is determined that the file system storage section has sufficient free space but not sufficient continuous free space, a continuous area having the size of the additional software code or information is created.

5. Method for managing storage area according to claim 1, whereby the file system storage section comprises an additional software code indicator for indicating if free space from the file system storage section is allocated to additional software code or information.

6. Method for managing storage area according to claim 1, whereby in case that the free space from the file system storage section allocated to the additional software code or information is not necessary for the storage of the additional software code or information any more, it is allocated back to the file system storage section.

7. Computer program product directly loadable into the internal memory of a portable radio communication equipment, comprising software code portions for performing the steps of claim 1 when said product is run on a computer.

8. Portable radio communication equipment for communication in a radio communication system, comprising means for performing the steps of claim 1.

* * * * *

UNITED STATES PATENT AND TRADEMARK OFFICE
CERTIFICATE OF CORRECTION

PATENT NO. : 7,707,352 B2  Page 1 of 1
APPLICATION NO. : 11/573153
DATED : April 27, 2010
INVENTOR(S) : Wladyslaw Bolanowski et al.

It is certified that error appears in the above-identified patent and that said Letters Patent is hereby corrected as shown below:

Front page, Section (60), Related U.S. Application Data should be added:
-- Related U.S. Application Data
(60) Provisional Application No. 60/601,235, filed on August 13, 2004. --

Specification, CROSS REFERENCE TO RELATED APPLICATION should be added immediately after the title:
-- CROSS REFERENCE TO RELATED APPLICATION
This application is a §371 of International Application No. PCT/EP2005/008540 filed on August 5, 2005, which claims benefit to U.S. Provisional Application No. 60/601,235 filed on August 13, 2004, and also claims priority to European Application No. 04018594.4 filed on August 5, 2004. --

Signed and Sealed this
Eleventh Day of September, 2012

David J. Kappos
*Director of the United States Patent and Trademark Office*